United States Patent [19]

Hunt et al.

[11] 3,798,366

[45] Mar. 19, 1974

[54] INFRARED IMAGING SYSTEM

[76] Inventors: Robert P. Hunt, 331 Concord Dr., Menlo Park, Calif. 94025; Richard H. Winkler, 4051 Scripps Ave., Palo Alto, Calif. 94086

[22] Filed: Mar. 6, 1972

[21] Appl. No.: 232,015

[52] U.S. Cl. .............. 178/6.8, 178/7.6, 178/DIG. 6, 178/DIG. 8, 178/DIG. 27, 178/DIG. 36, 250/334, 340/324 A

[51] Int. Cl. ........ H04n 3/08, H04n 5/22, H04n 7/18

[58] Field of Search .......... 178/6.8, DIG. 8, 7.3 DC, 178/7.5 DC, DIG. 1, DIG. 4, DIG. 6, DIG. 36; 340/324 A

[56] References Cited

UNITED STATES PATENTS

| | | | |
|---|---|---|---|
| 3,718,757 | 2/1973 | Gulitz | 178/DIG. 36 |
| 3,631,457 | 12/1971 | Hamada | 340/324 A |
| 3,278,680 | 10/1966 | Hummel | 178/DIG. 6 |
| 3,404,309 | 10/1968 | Massell | 315/18 |
| 3,730,985 | 5/1973 | Whitney | 178/DIG. 8 |
| 3,576,944 | 5/1971 | La Baw | 178/DIG. 8 |
| 3,742,136 | 6/1973 | Olsson | 178/DIG. 8 |
| 3,557,305 | 1/1971 | Dann | 178/7.5 DC |
| 3,619,648 | 11/1971 | Wolber | 178/7.5 DC |
| 3,576,944 | 5/1971 | La Baw | 178/DIG. 8 |
| 3,704,342 | 11/1972 | Stoddard | 178/DIG. 8 |
| 3,663,749 | 5/1972 | Cannon | 178/6.8 |

FOREIGN PATENTS OR APPLICATIONS

| | | | |
|---|---|---|---|
| 1,149,915 | 6/1963 | Germany | 178/DIG. 36 |

*Primary Examiner*—Howard W. Britton
*Attorney, Agent, or Firm*—Limbach, Limbach & Sutton

[57] ABSTRACT

A pair of scanning mirror systems scans an object image in two dimensions over an infrared detector. The detector signal and signals proportional to the position of the mirror systems permit display of an image of the object on a video monitor. The video monitor display includes a portion thereof which is an image of the object and another portion thereof which is a temperature profile curve of the infrared intensity across one line of the image. A memory is optionally employed to store a frame of video information and to replay it at a much faster rate than it is scanned in order to form a persistent image on the video monitor. Automatic brightness control circuitry adjusts the displayed signal level according to the maximum temperature of the object being imaged.

15 Claims, 9 Drawing Figures

INFRARED IMAGING SYSTEM

BACKGROUND OF THE INVENTION

This invention relates generally to electronic imaging systems and more particularly to systems for detecting an infrared image of an object and displaying it in the visual domain.

In thermographic equipment, the infrared energy radiating from an object is detected, converted into time varying electrical signals and these signals are reconstructed into an image in the visual region of the electromagnetic energy. A thermograph is used in medical diagnostic work where the object is a human patient. The visual picture displayed of the patient shows light and dark areas which are proportional to the temperature of the patient.

Presently available thermographic instruments suffer from certain disadvantages. One disadvantage is the necessity of interconnecting several different packages to form an operable thermographic unit. Another disadvantage is the inability to observe a display of an object in real time in order to adjust the instrument before taking a photograph of the visual display. Another disadvantage is the incompatibility of present thermographic instruments with other video components for recording and display purposes. Yet another disadvantage is the complex circuitry required for displaying both a picture of the object and a curve showing a temperature profile across the object. It is a principal object of the present invention to provide a thermographic instrument that overcomes these disadvantages.

SUMMARY OF THE INVENTION

Briefly, the thermograph of the present invention utilizes an infrared sensitive single element detector across which a two dimensional image of an object is scanned by a pair of mirror assemblies. A rotating polygon mirror assembly scans the horizontal aspect of the image of the object across the detector. A rocking mirror scans the image vertically across the detector. A video monitor is provided for displaying an image of the object simultaneously with its being scanned across the detector. A camera may then record the display. Video processing circuits provide for displaying an image of the object on a portion of the video monitor screen and on a distinct portion of the video monitor screen to display a graph which shows quantitatively the temperature variation across a selectable horizontal line of the object. The video processing circuit also provides for marking the line at which the temperature profile is being taken on the video monitor with a bright white line (fiducial mark). A plurality of bright graticule lines are also provided by the video monitor to be superimposed over the profile curve on the monitor display. The signals developed for driving the video monitor are independent of any position with respect to the monitor screen itself since the entire display is electronically presented.

The entire thermograph unit including the scanner and the video monitor are housed in a single package by employing various techniques for reducing interference effects between closely placed components. One end of the unit is pointed at an object and its thermographic image is displayed on a video monitor at an opposite end. This permits, for instance, use of the thermograph unit over a patient bed. A single package is very convenient and maneuverable.

The video processing circuits also include an automatic brightness control wherein the maximum brightness of one video frame is stored electronically and then transferred to a second storage means at the end of each frame for biasing the video signal level during the next frame. The automatic brightness control prevents hot spots from driving the video picture to nonlinear portions of the electronic and display system. Additionally, the intensity of all portions of the picture is referenced to the brightest spot on the image rather than to room temperature or some other level independent of the picture. The hottest spot of the video picture is automatically fixed at the white level of the cathode ray tube while the video signal measures down from the white level to the black level. The temperature profile graph is thereby displayed with a meaningful relative scale that permits quantitative measurements.

A temperature reference bar is also scanned along with the image field. The temperature reference bar is provided on the instrument case. At that portion on every horizontal scan line wherein the infrared detector is being exposed to the reference temperature of the bar, the video signal is referenced to a predetermined direct current level. This minimizes the effects of low frequency noise in a preamplifier circuit for the weak detector signal output.

A memory unit is provided for receiving video information from the video processing circuits at a slow rate of scanning the image over the detector. Since the optimum image scanning rate is less than that which would be required to simultaneously present a video display that persists in its entirety, the memory unit is employed to store a frame of video information as developed by the thermograph and then repetitively display this one frame on the video monitor at the standard television rates. This permits almost real time focusing and adjustment of the thermograph and is much faster than having to rely on photographs or some complicated optical system for making the focusing adjustment. It is also more satisfactory than using a persistent phosphor CRT screen for providing a stable, easily viewed image for evaluation of data directly from the CRT screen.

A single video monitor is capable of operating either in a slow display mode directly from the signal developed as the image is scanned over the detector or in a fast display mode from the signal replayed from the memory. The fast mode eliminates the time delay imposed by the development of photographic film for focusing and adjusting the thermograph. When properly adjusted, ordinary film may then be employed to record a display, preferably when the instrument is operated in the slow mode for the best quality. The fast mode thus greatly reduces the quantity of film required with subsequent cost savings. The quality of a picture obtained for a permanent record is improved with the use of ordinary photographic film. Patient identification data are also recorded along with each photograph of a patient display, thereby permitting use of roll film. Each picture is separately identifiable from the information exposed thereon.

Additional features and advantages of the various aspects of the present invention are described in the following description when taken in conjunction with the accompanying drawings.

DESCRIPTION OF THE PREFERRED EMBODIMENTS

Figures 1, 2:
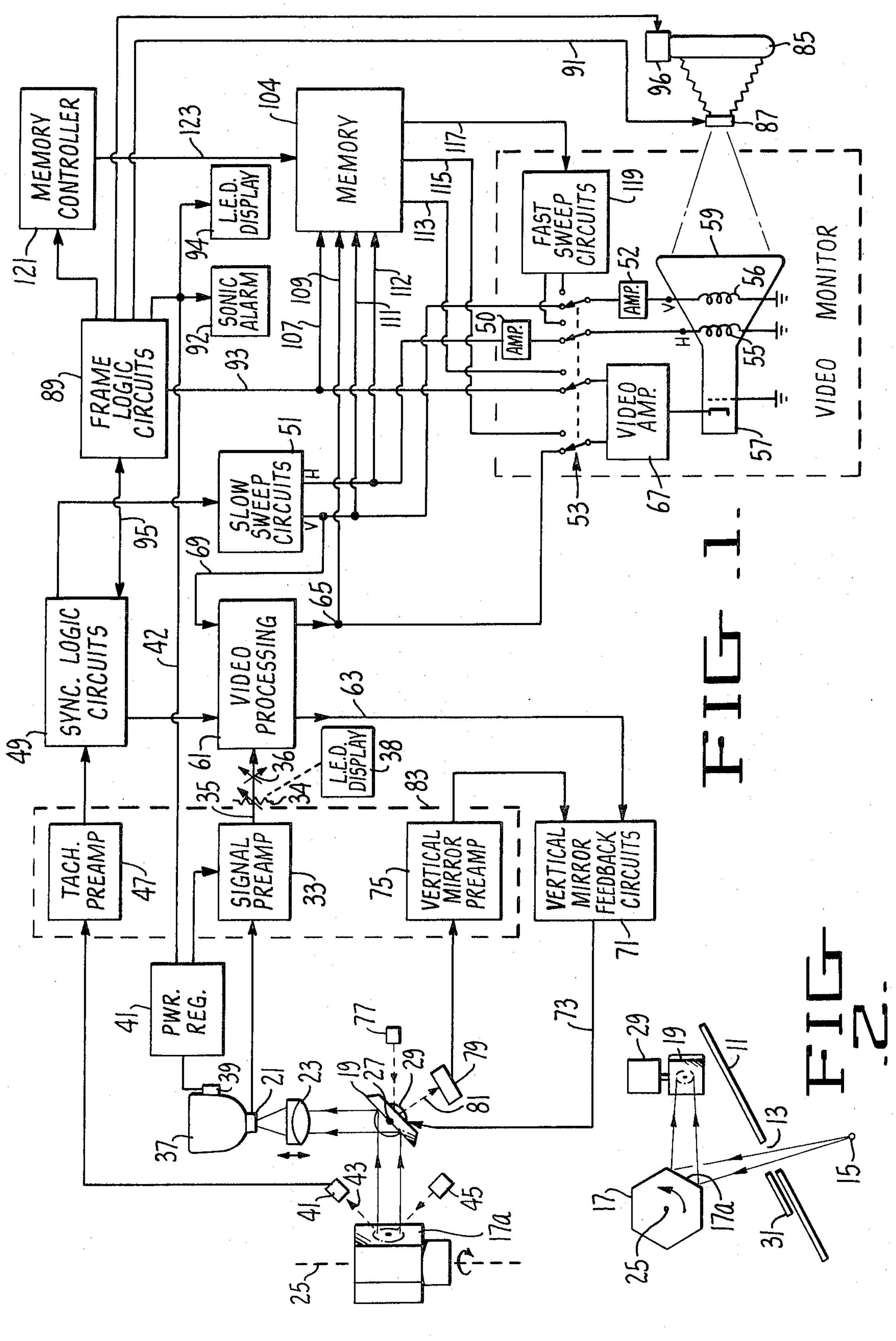
FIG. 1 is a general block diagram of the improved thermograph of the present invention.
FIG. 2 is a plan view of the optical scanning system of FIG. 1.

Referring to FIGS. 1 and 2, the thermograph optical system is first described. A front panel 11 of the thermograph instrument has an opening 13 through which the optical system views an object field. An image of an object point 15 is reflected first by a rotating polygon mirror assembly 17, then further reflected by a tilting mirror 19, to then be focused onto a single element detector 21 substantially a point in size by a germanium lens assembly 23. The germanium lens 23 is movable along its optical path in order to sharply focus an image of the object point 15 into a surface containing the detector 21. Each of the vertical faces, such as face **17*a* on the rotating polygon mirror assembly 17, is a reflective mirror surface which scans an image of an object horizontally across the detector 21. The polygon mirror assembly 17 is rotated at a constant angular velocity about an axis 25. For precision scanning, each of the mirror surfaces, such as 17*a*, on the assembly 17 are accurately positioned parallel with the axis of rotation 25. The mirror assembly 17** is shown to have six mirror sides which means that one revolution thereof will scan an image across the point detector six times in the same direction.

The tilting or rocking mirror 19 is rotatable about an axis 27. The mirror 19 is rotated back and forth about this axis through an arc length sufficient to scan an object image across the detector 21 in a vertical direction. The mirror 19 is driven by a direct current torque motor 29. During a single two dimensional scan of an object field (one frame), the mirror 19 scans an object image in its vertical direction across the point detector 21 just once while the polygon mirror assembly 17 scans the object image across the point detector a large number of times. Quantitatively, for a specific example of a thermograph described herein, an object image is scanned horizontally 528 times across the point detector 21 while the image is scanned only once in its vertical direction.

For compactness, and in order to suppress unwanted interference radiation, a motor (not shown) that drives the polygon mirror assembly 17 is housed within the mirror assembly. A pair of bearings are positioned above and below the motor along the axis of rotation. The rotating mirror polygon is attached at its top along the axis of rotation to the motor shaft. The ferrous metal shell of the rotating polygon mirror element itself suppresses unwanted radiation from escaping from the motor into electronic circuits. The polygon mirror 17 is driven at a substantially constant angular velocity. The internal structure of the polygon mirror element is shaped relative to its driving motor to pump air up into the mirror around the motor for cooling. The mirror assembly 17 should be kept cool so that the mirror surfaces will not affect the detector signal.

A reference temperature bar 31 is provided just inside the thermograph case adjacent the aperture 13. As a result, the detector 21 is exposed to the reference bar 31 just prior to the beginning of each horizontal line scan. As described hereinafter, the video signal is electronically referenced to a predetermined value just prior to each horizontal scan line.

In a specific form of the thermograph described herein, a 30° field of view is provided in the horizontal direction for imaging an object. As a result, for each horizontal line scan of the image, the polygon 17 rotates 15°. Since the polygon mirror assembly 17 must rotate 60° to form one complete horizontal line scanning cycle (for a six-sided mirror assembly), the thermograph system is performing its imaging function for only 25 percent of the time.

A thermograph operates by imaging the infrared radiation of an object field. Accordingly, the detector 21 is primarily sensitive to the infrared region of the electromagnetic energy spectrum. Since a thermograph is often used for medical diagnostic work, it is desirable for this sensitivity to adequately include electromagnetic radiation emitted from the body, which is about 10 microns in wavelength. An appropriate detector is a mercury-cadmium-telluride detector that is commercially available. This type of detector is a semiconductor which changes its resistance in proportion to the intensity of radiation in the infrared region that is incident thereon. A pre-amplifier 33, which is preferably a standard cascode amplifier, receives the weak signals from the detector 21 (micro-volt variations) and produces stronger voltage variations in its output line 35 (milli-volt variations).

The detector 21 is kept cool by attachment to the bottom of Dewar container 37. The container 37 is filled with liquid nitrogen as a coolant. A thermistor 39 is also attached to the container 37 in order to sense its temperature. When the temperature of the container 37 reaches a certain predetermined value, the signal generated by the thermistor 39 operates a power regulator circuit 41 to shut off power from the preamplifier 33 to the detector 21, thereby preventing damage of the detector. At the same time, an audible alarm 92 and a visual indicator 94 are activated through a line 42 so that the operator will know that his system is no longer working. Since the cause of overheating is generally a decline in the volume of liquid nitrogen within the container 37, the operator can then add more liquid nitrogen thereto in order to make the system operable again. The power regulator circuit 41 additionally controls the power supply level to the signal pre-amplifier 33 in order to reduce variations therein to a very low level so that they will not be carried through in the preamplifier output 35 as undesirable noise.

Position information of the object image relative to the detector 21 is obtained by an optical detector 41 which receives a synchronizing light beam 43 reflected from the faces of the polygon mirror assembly 17, as generated by a stationary light source 45, each time a mirror surface of the polygon assembly is in a predetermined position. These position indicator (tachometer) pulses, one for each horizontal scan line of the image, are amplified by a pre-amplifier 47 and then are supplied to a synchronous logic circuit block 49, described in more detail hereinafter with respect to FIG. 7. The circuit 49 emits synchronizing pulses to standard horizontal and vertical video sweep oscillator circuits 51. The horizontal sweep output of the sweep circuits 51 is amplified by a linear amplifier 50 and then applied through one set of terminals of a mode control switch 53 to a horizontal electromagnetic deflection coil 56. The vertical sweep output of the sweep circuits 51 is applied through another pole of the mode control switch 53 to a linear amplifier 52. The output of the amplifier 52 is applied to a vertical electromagnetic deflection coil 55. The deflection coils 55 and 56 are mounted on a cathode ray tube 57 and scan its electron beam across a phosphor face 59 in a continuous raster pattern that is typical of ordinary television display techniques.

A video processing circuit block 61 includes D.C. clamping, line blanking, automatic brightness control, temperature profile circuits, bright line insertion circuits, and circuits for developing a vertical sweep control signal in a line 63 which is used to drive the rocking mirror 19. These circuits are described in more detail hereinafter with respect to FIGS. 4 and 5. An output 65 (variations in the order of volts) of the video processing circuit 61 is connected through a separate portion of the mode control switch 53 to a video amplifier 67 and thence to a cathode of the cathode ray rube 57.

It will be noted that the position of the polygon mirror assembly 17 through its pulse detector 41 synchronizes the horizontal sweep oscillator in the block 51 of FIG. 1 in order to scan the electron beam of the cathode ray tube 57 horizontally in synchronism with an image of the object scanning scross the point detector 21. As explained hereinafter with respect to FIGS. 5 and 7, synchronism between scanning the image in its vertical direction by tilting the mirror 19 and scanning the electron beam of the cathode ray tube 57 in a vertical direction are both controlled by an internally generated signal. A counter in the synchronizing logic circuit block 49 of FIG. 1 emits a vertical synchronizing pulse at periodic intervals. This pulse drives a vertical sweep oscillator within the block 51 which directly drives the deflection coils 55 on the cathode ray tube 57, and also supplies a vertical scanning signal 69 to the video processing block 61. As described in detail hereinafter with respect to FIG. 5, a portion of the video processing circuit 61 takes the vertical sweep signal in the line 69 and modifies it somewhat to develop the scanning signal in the line 63 for the tiltable mirror 19. The signal developed in the line 63 is proportional to the desired vertical position of an image with respect to the detector 21 as a function of time.

The driving function on the line 63 is utilized by feedback and mirror driving circuits 71. An error output 73 of the block 71 then drives the torque motor 29 to position the rocking mirror 19. For accurate position control in accordance with the driving function in the line 63, a feedback loop is provided which includes a preamplifier 75 and an optical arrangement for detecting the position of the vertical mirror 19. A light source 77 reflects a light beam off the backside of the mirror 19 and into a linear detector 79. The position of the reflected light beam 81 along the linear detector 79 is proportional to the angular position of the vertical scanning mirror 19. The signal of the linear detector 79 is then amplified by the pre-amplifier 75 and compared in the feedback circuit 71 with the desired driving function 63. An error signal, which has been electronically processed to provide damping of the system, is developed in the line 73 for driving the torque motor 29. Additional specific details of the optical and electronic feedback loop for driving the mirror 19, including the blocks 71 and 75, may be had by reference to a copending application of Robert P. Hunt, entitled, "Image Scanner Drive System."

The pre-amplifiers 33, 47 and 75 are preferably housed in an enclosed compartment 83 to provide shielding of these circuits from external noise. Since the pre-amplifiers are operating on very low level signal inputs, they are susceptible to interference from radiation of other components, especially when combined in a small single unit package. Undesirable noise is especially a problem in this type of instrument wherein the scanning speed of an image over the detector 21 is very slow, in the order of two seconds for one frame.

For many applications of a thermograph as outlined in FIG. 1, especially in medical diagnostic work, it is desirable to have a permanent photographic record of the image on the face 59 of the cathode ray tube 57 for a given object of interest, such as a human patient. Accordingly, a camera 85 is provided to take a picture of the display at 59. Such a camera can be a Polaroid type for quick picture development or can be a conventional roll film type where instant development is not required. Its shutter assembly 87 is modified, however, to be electrically interconnected with the electronic display circuits through a frame logic circuit block 89. There are two switches provided on the shutter assembly 87. One switch sends a signal in the line 91 to the frame logic circuit block 89 when an operator has just started to open the shutter and expose the film in the camera 85. This signal causes the frame logic circuit block 89 to develop a blanking signal in a line 93 which is connected with the video amplifier 67 through a separate portion (pole) of the mode control switch 53. The picture is then blanked on the face 59 of the cathode ray tube 57 just before the shutter opens. As the shutter is opened all the way by the operator, its second switch is thrown which sends a signal in the line 91 that causes, through a line 95, the counter in the synchronizing logic circuit block 49 to be reset and thus start the sweep of the electron beam in the cathode ray tube 57 at the top of a frame.

Circuits are provided in the frame logic circuit block 89 to again develop a blanking signal 93 after a single frame has been scanned on the face 59 of the tube. This is accomplished by a separate counter within the block 89 that measures out the time taken to scan one frame exactly. At the end of this time, the blanking is reintroduced into the line 93. During the active scan which exposes film to an image, an audible alarm 92 sounds and a visual indicator 94 lights to let the operator and patient know that one frame is being traced out while the camera shutter is open. The same counter in the frame logic 89 that causes blanking to be removed for a single frame time also controls the audible and visual indicators 92 and 94. When the blanking is restored in the line 93 at the end of a frame, the audible alarm 92 and visual indicator 94 cease indicating thus telling the operator the exposure is complete and that the shutter can be released. When the operator manually releases the shutter in the shutter assembly 87, the frame logic circuit block 89 removes the blanking from the line 93. This system assures that film in the camera 85 will be exposed to only a single complete frame trace on the face 59 of the cathode ray tube 57, thus providing a sharp permanent record photograph of the infrared radiation of an object.

It should also be noted that additional blanking signals are developed in the synchronizing logic circuit block 49 which are applied to the video monitor through the line 93 by interconnection of the block 49 with the frame logic circuit block 89. Certain aspects of this blanking are described hereinafter but generally it may be noted that the video amplifier 67 is caused to be blanked whenever useful information is not being presented to it for display.

Figures 3, 4:
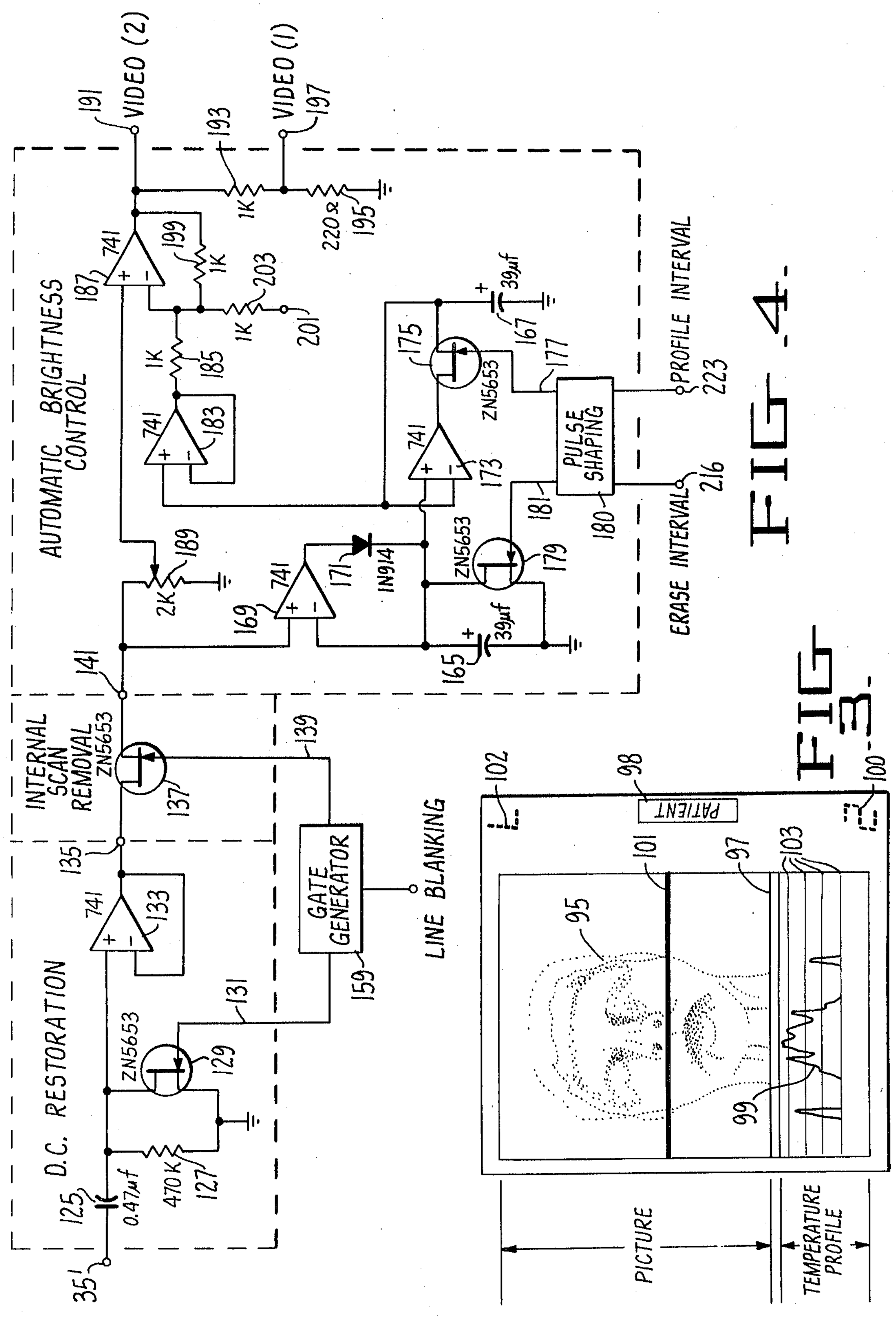
FIG. 3 shows a photograph of a typical display on the video monitor of a system of FIG. 1.
FIG. 4 is a circuit diagram of a portion of the video processing block of FIG. 1.

Referring to FIG. 3, a general outline of the type of display presented by the circuit of FIG. 1 on the face 59 of the cathode ray tube is provided. A picture 95 of an object whose image is being scanned across the detector 21 is displayed in the top portion of the picture display. This is a visual image of the object as observed by a detector limited to the infrared region (5–13 microns) of the electromagnetic energy spectrum. A graticule line 97 is brightly written across the screen at the bottom of the picture 95 by circuits in the video processing block 61. Below the picture 95 is displayed a curve 99 which represents the relative intensity of the picture 95 across a line 101 thereof. This shows the temperature profile of the object at a certain line thereacross. A bright white line is generated across the line 101 as a fiducial mark to show the area of the object where the temperature profile 99 is being taken. In order to permit some quantitative determination of the magnitude of the temperature profile 99, additional bright graticule lines 103 are provided as part of the display and are evenly spaced for comparison with the temperature profile curve 99.

Throughout display of one frame of information on the face 59 of the cathode ray tube 57 as shown in FIG. 3, the electron beam of the cathode ray tube is scanned in a normal raster pattern from the top of the frame to the bottom of the frame as is normal for a video system. The lower portion of the picture which displays temperature profile information is also presented as part of the raster scan. Instead of scanning the electron beam directly along the path of the temperature profile curve 99, as is done in oscilloscope display devices, the modulation of the intensity of the electron beam is controlled by circuits in the video processing block 61 in order to present profile curve 99 without having to change scanning of the electron beam from a normal video raster to an oscilloscope type. This permits a much faster display and furthermore develops a display that is compatible with other existing video equipment. The graticule lines 97 and 103 and the fiducial mark 101 are also part of the video signal that is developed, which further makes the composite video signal compatible with standard video equipment external to the thermograph. No alignment of external lines on the face of the cathode ray tube screen is necessary. All of this is contained in the video signal itself.

In order to display and record on film an identification of the patient or other object, a data accessory 96 of FIG. 1 is provided on the film pack of the camera 85 for exposing the film with its own lenses that are independent of the main camera lens. The photograph of FIG. 3 then includes a portion 98 that identifies the patient in writing. This identification is along one side of the video display of the patient's thermogram. A printed card with the patient's identification inserted into the data accessory 96 just prior to a photograph being taken of the video display. The identification card is lighted in the accessory 96 simultaneously with the video monitor being unblanked by the logic circuits 89 in response to the operator opening the shutter 87. The identification card ceases to become lighted after a single video frame is scanned even though the shutter may remain open.

The video signal output 35 of the signal preamplifier 33 is attenuated by a sensitivity potentiometer 34. The potentiometer 34 is preferably a network of fixed resistors selectable by a multi-position switch. The position of this switch, and thus the video signal level applied to the video processing circuits 61, is displayed adjacent to the cathode ray tube face 59 by an appropriate light display circuit 38. A character 100 of FIG. 3 is recorded on the film adjacent the video temperature profile curve which indicates the setting of the potentiometer 34 during exposure of the film. This number 100 gives the scale of the temperature profile curve 99.

Another visual display device is provided adjacent the cathod ray tube for recording an L 102 of FIG. 3 or an R. The letter displayed is selected by the operator by activating a toggle switch on the instrument case, or no letter may be displayed at all. The letter display provides a record on the photograph as to which side of the patient is being recorded.

A polarity reversing switch 36 is also provided in the output circuit 35 of the pre-amplifier 33 of FIG. 1. The switch 36 controls whether the video display will be white on a black background or black on a white background.

As mentioned above, the frame rate of the equipment described in FIG. 1 is rather slow, about 2 seconds in the specific example described herein. This is to be compared with the normal video rate of 60 frames per second. The reason for the slow speed is the result primarily of a trade-off between a desirably high thermal sensitivity, a desirably high resolution of the video image and a desirable high scanning speed. As the scanning speed increases, the resolution of the video information obtained goes down for a given temperature sensitivity. A two second frame time has been found to give a satisfactory resolution. Also, the mechanical stability of the scanning mirrors limit the scanning speed. Existing two dimensional arrays of infrared radiation detectors that provide satisfactory resolution are far too expensive for a commercial product.

The slow frame rate, while producing a high resolution, does present problems in interference with the desired video and control signals by 60 Hz. and 15,750 Hz. sections of the equipment. Therefore, shielding of portions of the circuit from the sources of the 60 Hz. and 15,750 Hz. undesired interference is important. Suppression circuits are also required. These problems are magnified even more when the entire thermograph components described so far are housed in a single enclosure of reasonable size, so shielding and suppression of noise cannot be overlooked.

It will be appreciated that with the 2 second frame period in the thermograph of FIG. 1 that certain inconveniences result since a typical white phosphor P4 as used in television display tubes on the face 59 of the cathode ray tube 57 does not have a sufficient retention time to give the illusion of a persistent image to the thermograph operator. Therefore, focusing of the lens 23 and alignment of the object image in a desired manner is a rather slow process when a picture has to be taken with the camera 85, corrections made in the focusing and alignment, an additional picture taken, and so forth. Therefore, it is preferable that a memory 104 be employed to record one video frame at the two-second rate and replay that frame repetitively to the video monitor at a 60 field-per-second rate (30 frames-per-second). The memory 104 may be, for instance, a commercially available Hughes 639A Scan Converter that mounts near the thermograph. This particular memory device writes a frame with an electron beam and has a capability of reading the picture therefrom at the 60 field-per-second rate for 5 or 10 minutes before the stored image deteriorates seriously.

The input to the memory 104 is the same as the signal inputs described above to the video monitor, namely a blanking signal in a line 107, a video signal in a line 109 and horizontal and vertical sweep signals in lines 111 and 112. An output of the memory at the 60 field-per-second rate includes a line 113 containing a fast blanking signal, a line 115 containing the video signal at the faster rate and a line 117 which delivers fast horizontal and vertical sweep circuit block 119 within the video monitor. The mode control switch 53 is caused to be switched by the operator from the slow scan input lines of the memory to its fast scan output lines. When the video monitor is connected to the output of the memory, the operator can then make alignment and focusing adjustments in something nearer to real time when compared with having to take a photograph of each frame and developing it before alignment and focusing errors are detected. Once the circuit is properly adjusted for a given object, it is still preferable to switch the mode control switch 53 to receive information in a slow scan mode for recording a picture with the camera 85 since the sharpest picture will be obtained directly in the slow scan mode. It will be noted also that the memory provides the additional function of stepping up the scanning rate of the instrument to provide additional compatibility with external video equipment of a standard nature.

The vertical sweep signal from the fast sweep circuits 119 is connected by the switch 53 to the same linear amplifier 52 used to amplify the slow vertical sweep signal developed in the block 51. The horizontal sweep signal from the fast sweep circuits 199 is not, however, amplified by the linear amplifier 50 that is used to amplify the slow horizontal sweep signal. Rather, the fast horizontal sweep signal from the block 119 is connected directly to the horizontal deflection coil 55 through the mode control switch 53. The fast horizontal sweep signal is generated by a standard flyback circuit. The amplifier 50 would be too large for a compact thermograph if it could handle adequately the high frequency and voltage of a fast horizontal sweep signal.

In order to control when a new frame of video information is written into the memory 104, a memory controller block 121 is provided. When an output 123 of the memory controller 121 contains an erase command pulse followed by a write command pulse, a new frame of video information is written into the memory through the lines 107, 109 and 111. The memory will then continue to display the newly stored video frame at the rate of 60 fields per second at its output lines 113, 115 and 117 until the next combination of erase and write commands are provided to the memory through the line 123. The time delay between commands may be manually controlled by the operator through a switch or may be automatically cycled by means of a counter within the memory controlled 121 that is incremented in response to the vertical synchronizing pulses derived from the counter of the synchronizing logic circuit block 49. The counter in the memory controller 121 preferably has output circuits provided with a switch that the operator may control to choose the time period between commands to the memory 104. For instance, it is convenient that the periods of 4, 8, 16, 32, and 64 seconds be provided for choice by the operator. That is, if the operator has chosen to operate the memory on a 16 second cycle by choosing that output of the counter within the memory controller 121, a new frame of video information will be written into the memory 104 each 16th second automatically. The 60 field per second output of the memory that is observed on the video monitor is then updated each 16 seconds to a new video frame of information. The shorter intervals are provided for convenient operator periods and the longer intervals are provided for time lapse photographic applications in dynamic thermographic examination.

Referring to FIG. 4, a terminal 35' receives a signal from the polarity reversing switch 36 in the output circuit of the pre-amplifier 33 of FIG. 1. A coupling capacitor 125 connects this pre-amplified signal with subsequent stages. The coupling capacitor 125 is necessary for isolation since high gain, stable direct current amplifiers are very difficult to provide. The capacitor eliminates the D.C. level of the video signal but can also introduce an erroneous D.C. level dependent on the average brightness of video information being passed therethrough, since the average voltage across the coupling capacitor 125 is always zero. A local hot brightness spot raises the average voltage level across the coupling capacitor 125, and thereby also raises the average voltage level of the video signal passing therethrough.

In order to eliminate this brightness change by the coupling capacitor 125, a D.C. restoration circuit is provided wherein a resistor 127 is normally connected with the output of the capacitor 125 and ground. However, an FET device 129 is also connected between the output of the capacitor 125 and ground potential. The gate of the FET device 129 is pulsed through a line 131 just preceding each horizontal scan line when the detector 21 is receiving information of the reference temperature bar 31 (FIG. 1). Therefore, when the video signal at the point 35' is at a level which remains at a reference constant, the signal at the output of the capacitor 125 is set (clamped) to zero. This restores the voltage across the capacitor 125 to a constant value at the beginning of every horizontal line scan. The D.C. restored signal is then amplified by an operational amplifier 133 whose output is shown in FIG. 4 to pass through a terminal point 135. The output of the amplifier 133 is also connected back to its inverting input.

It was earlier explained that the desired object field is being scanned by the rotating polygon mirror 17 of FIG. 1 and 2 only 25 percent of the time. During most of the remaining portion of time when the desired object field or the reference temperature bar 31 are not being scanned, it is desired to interrupt the video signal from the rest of the circuit. This is done by an FET switching device 137 whose gate is controlled by a line 139. The FET device 137 is turned off by an appropriate voltate in the line 139 for the period of time when no desirable information is presented in a video signal at the point 135. The output of the FET device 137 is shown in FIG. 4 to pass through a terminal 141 to enter an automatic brightness control circuit.

Figure 9:
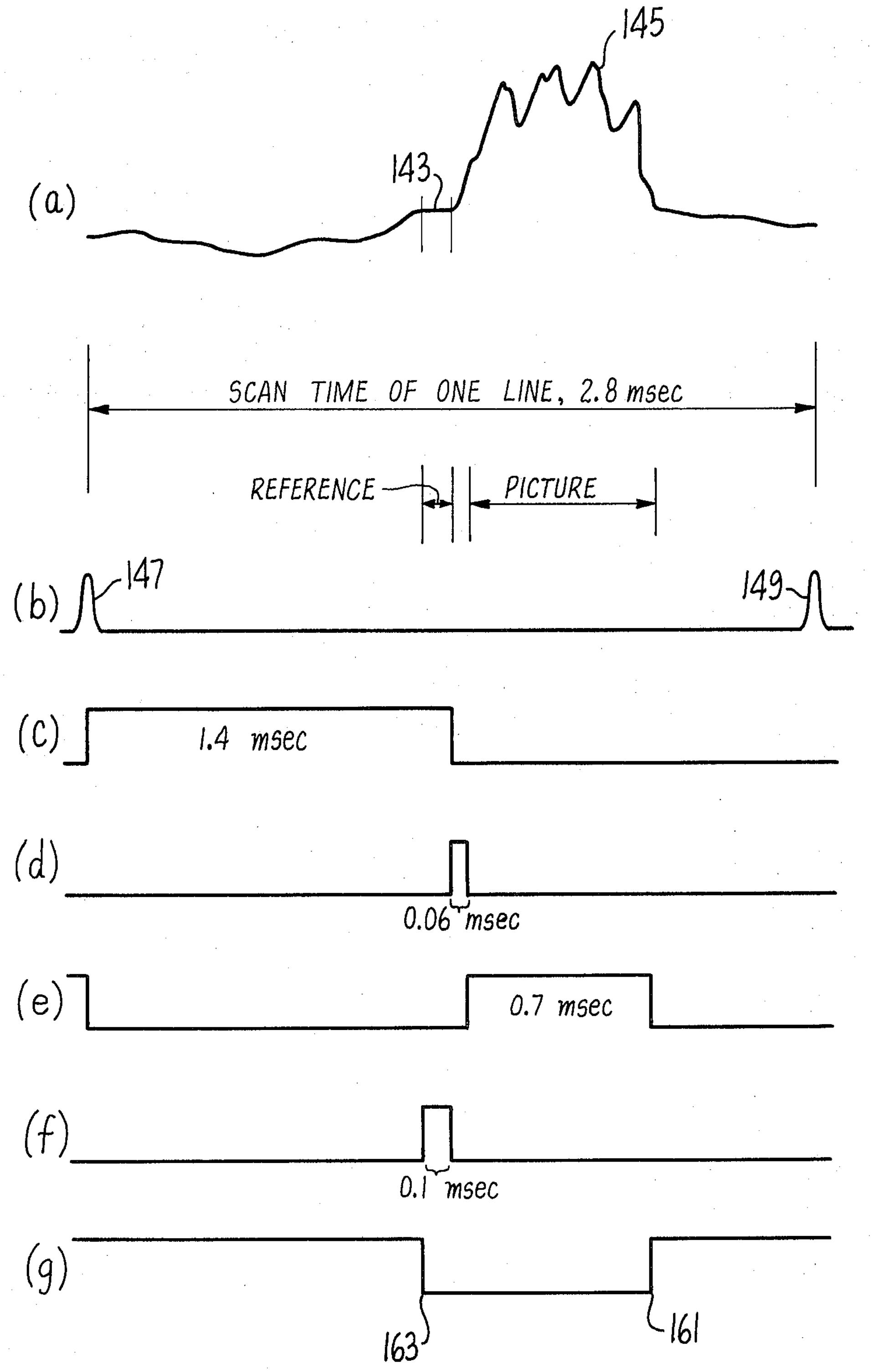
FIG. 9 illustrates the line timing of the thermograph system of FIG. 1.

Before proceeding to the automatic brightness control circuit of FIG. 3, it is useful to refer a line timing diagram of FIG. 9 wherein in FIG. 9*a* the video signal at point 35′ of FIG. 4 is shown. FIG. 9*a* shows the signal developed for one horizontal scan cycle of the image across the point detector 21 by the polygon mirror assembly 17. During a time interval noted at 143, the detector 21 is looking at the reference temperature bar 31 of FIG. 2. Shortly thereafter, the detector is looking at the desired object field, denoted on FIG. 9*a* to exist in a time interval marked 145. During the rest of each horizontal scan of the image across the detector 21, the detector is looking at unwanted information, such as the inside of the instrument or undesired object field space.

Referring to FIG. 9*b*, the synchronizing output of the pre-amplifier 47 is indicated wherein the pulses 147 and 149 are spaced exactly one horizontal line time apart and are detected from the rotation of the polygon mirror assembly 17 through the detector 41, as described above.

Figure 7:
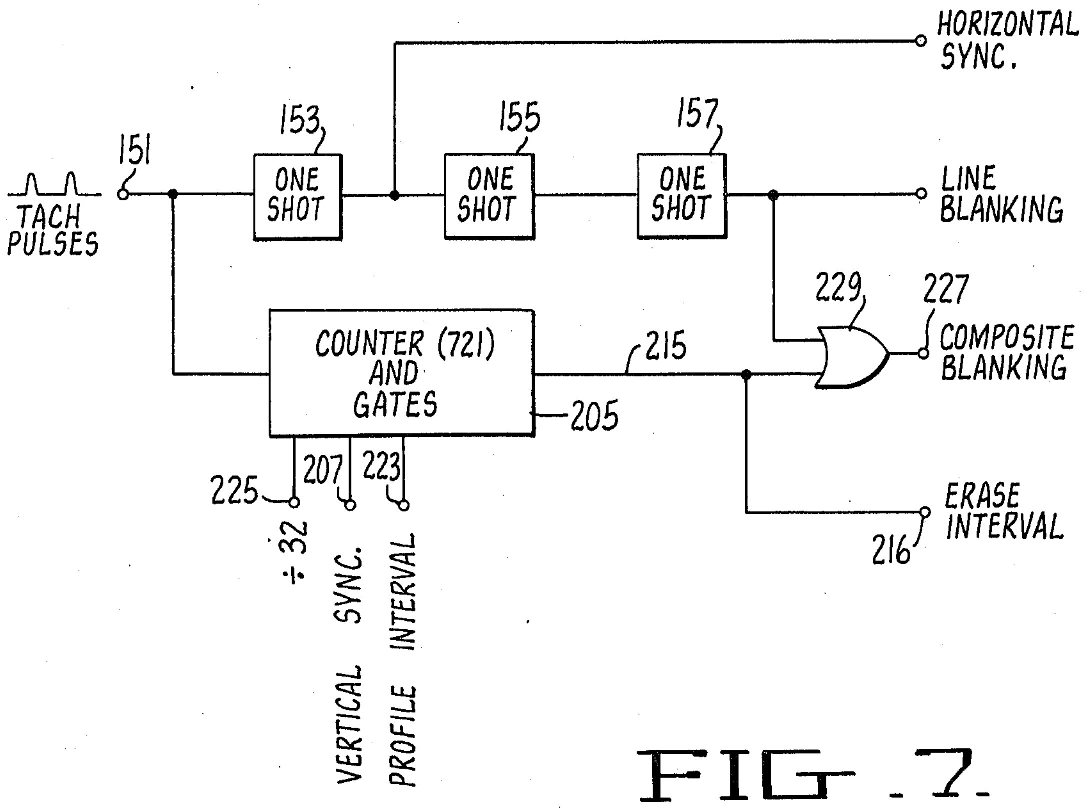
FIG. 7 is a block diagram showing a portion of the synchronous logic circuit block of the system of FIG, 1.

Referring to FIG. 7, the line timing elements of the synchronizing logic circuit block 49 of FIG. 1 are described. A terminal 151 is shown to receive the horizontal line pulses, such as those shown in FIG. 9*b*. Each pulse triggers a first monostable one-shot multivibrator 153 whose output pulse duration is set to be about one-half the horizontal line time. The trailing edge of this pulse generated the horizontal synchronizing pulse which is used to key the horizontal sweep oscillator in the block 51 of FIG. 1. The output of the one-shot 153 of FIG. 7 is shown in FIG. 9*c*.

The trailing edge of the output pulse of the one-shot 153 of FIG. 7 triggers a second one-shot 155 which has an output pulse as shown in FIG. 9*d* of a very short duration. The trailing edge of the pulse of FIG. 9*d* triggers a third one-shot 157 which has an output pulse as indicated in FIG. 9*e* for a period coincident with the time that the detector 21 is looking at the desired object field of view. Therefore, the output pulse of the one-shot 157, referred to as the line blanking signal, has a duration equal to 25 percent of the total scan time for one line of an image.

Referring again to FIG. 4, the line blanking signal of FIG. 93 is applied to a gate generator 159 that includes a one-shot and appropriate gates for developing the desired gate signals in the lines 131 and 139. FIG. 9*f* shows the gate signal of the line 131 wherein there is a voltage pulse coincident with the time period indicated by 143 on FIG. 9*a* wherein the detector is looking at the temperature reference bar 31. During the duration of the gate impulse of FIG. 9*f*, the FET device 129 is turned on and the coupling capacitor 125 (FIG. 4) thus has its output side connected to ground for the duration of the pulse of FIG. 9*f*.

Referring to FIG. 9*g*, the internal scan removal pulse of the line 139 of FIG. 4 as generated by the gate generator 159 in response to the line blanking signal of FIG. 9*e* is shown. At the end of the line blanking signal of FIG. 9*e*, denoted by 161 on FIG. 9*g*, the internal scan removal pulse in the line 139 begins and continues until the reference temperature bar is again exposed to the detector during the next horizontal line scan of the image. The end of the internal scan removal pulse is indicated on FIG. 9*g* to be at 163. Therefore, a video signal is presented at the point 141 of FIG. 4 only in the interval between 163 and 161 of FIG. 9*g* when the FET switching device 137 is in its on condition. During this time, the reference temperature bar and the desired object field of view are scanned for a single horizontal line scan.

Referring again to FIG. 4, the signal at the point 141 is passed through an automatic brightness control circuit whose principal elements are storage capacitors 165 and 167. The storage capacitor 165 is connected between ground potential and the inverting input of an operational amplifier 169, while the output of the amplifier is connected through a diode 171 to its inverting input. The video signal at the point 141 is connected with the non-inverting input of the amplifier 169. The storage capacitor 165 is thus charged to the maximum potential of the video signal at the point 141 during the time that it is connected therewith. There is a low charging time constant. The diode 171 is provided to prevent premature discharge of the capacitor 165. The operational amplifier 169 with a very high gain is provided to correct for non-linearities of the diode 171 so that the combination has a composite characteristic close to that of an ideal diode.

The voltage in the storage capacitor 165 is monitored by an operational amplifier 173 by connecting its non-inverting input therewith. The output of the amplifier 173 is connected through an FET device 175 to the second storage capacitor 167 and to the inverting input of the amplifier 173. The terminal of the capacitor 167 opposite to that connected to the FET device 175 is connected with ground.

After the image has been scanned across the detector fully in two dimensions during each frame, a pulse in a line 177 (FIG. 8*h*) is transmitted to the gate of the FET device 175. This brightness charge transfer pulse is for a duration sufficient to transfer the charge from the storage capacitor 165 to the storage capacitor 167. After this charge transfer is complete, an FET device 179, which is connected across the first storage capacitor 165, is turned on through its gate by a pulse supplied in a line 181 (FIG. 8*g*). The brightness capacitor discharge pulse at the terminal 181 is for a sufficient duration to discharge the capacitor 165 before a new frame of information appears at the point 141. The pulses in the lines 177 and 181 are derived from a pulse shaping circuit 180 in response to a profile interval signal (FIG. 8*e*) and an erase interval (FIG. 8*f*) signal from a counter 205 of FIG. 7.

The result of this sequence of events with respect to the automatic brightness control circuit of FIG. 4 is that a voltage proportional to the maximum brightness in one video frame is stored in the first storage capacitor 165 and then at the end of that frame it is transferred to the second storage capacitor 167. After the transfer, the capacitor 165 is discharged and enabled to receive the maximum brightness signal for a second frame of video information. During this second frame, the maximum brightness charge from the previous frame stored in the capacitor 167 acts as a bias to adjust the voltage level of the video signal at the point 141.

An operational amplifier 183 is connected at its non-inverting input to the capacitor 167 in order to monitor the voltage of the capacitor 167 without providing a drain thereto. The output of the amplifier 183 is connected through a resistor 185 to the inverting input of a subtracting operational amplifier 187. The non-inverting input of the amplifier 187 is connected to the video signal at point 141 through an adjustable resistance 189. The output of the amplifier 187 is shown to terminate in a terminal 191. A voltage divider consisting of a resistance 193 and a lower resistance 195 in series provides for a video output at a terminal 197 of a different range and impedance, but other wise the same as the output at the terminal 191. A resistance 199 between the output of the amplifier 187 and its inverting input provides a feedback path, which with a proper adjustment of the variable resistor 189 provides for the amplifier 187 to have an amplification of unity. The amplifier 187 thus serves to present at its output a video signal which is the signal at the point 141 lowered by an amount proportional to the voltage stored in the second storage capacitor 167, which in turn is proportional to the maximum video signal generated during the previous frame of information at the point 141. Thus the maximum output voltage of the amplifier 187 is always brought to a fixed D.C. level.

A direct current adjustable brightness signal is connected to a terminal 201 which is operably connected to the inverting input of the amplifier 187 through a series resistance 203 for convenience. This direct current brightness signal could just as well be inserted into the circuit at some other point after the amplifier 187.

An advantage to the automatic brightness control as shown in FIG. 4 is that it quickly responds to changing brightness characteristics of an object being viewed since the maximum brightness signal in one frame is used to bias the video signal only during the frame immediately following and not during any subsequent frames. This is a significant improvement over the approach taken in U.S. Pat. No. 3,597,617 — Passaro which averages the maximum brightness signal over a number of video frames. The automatic brightness control circuit of FIG. 4 herein is an open loop type.

Figure 8:
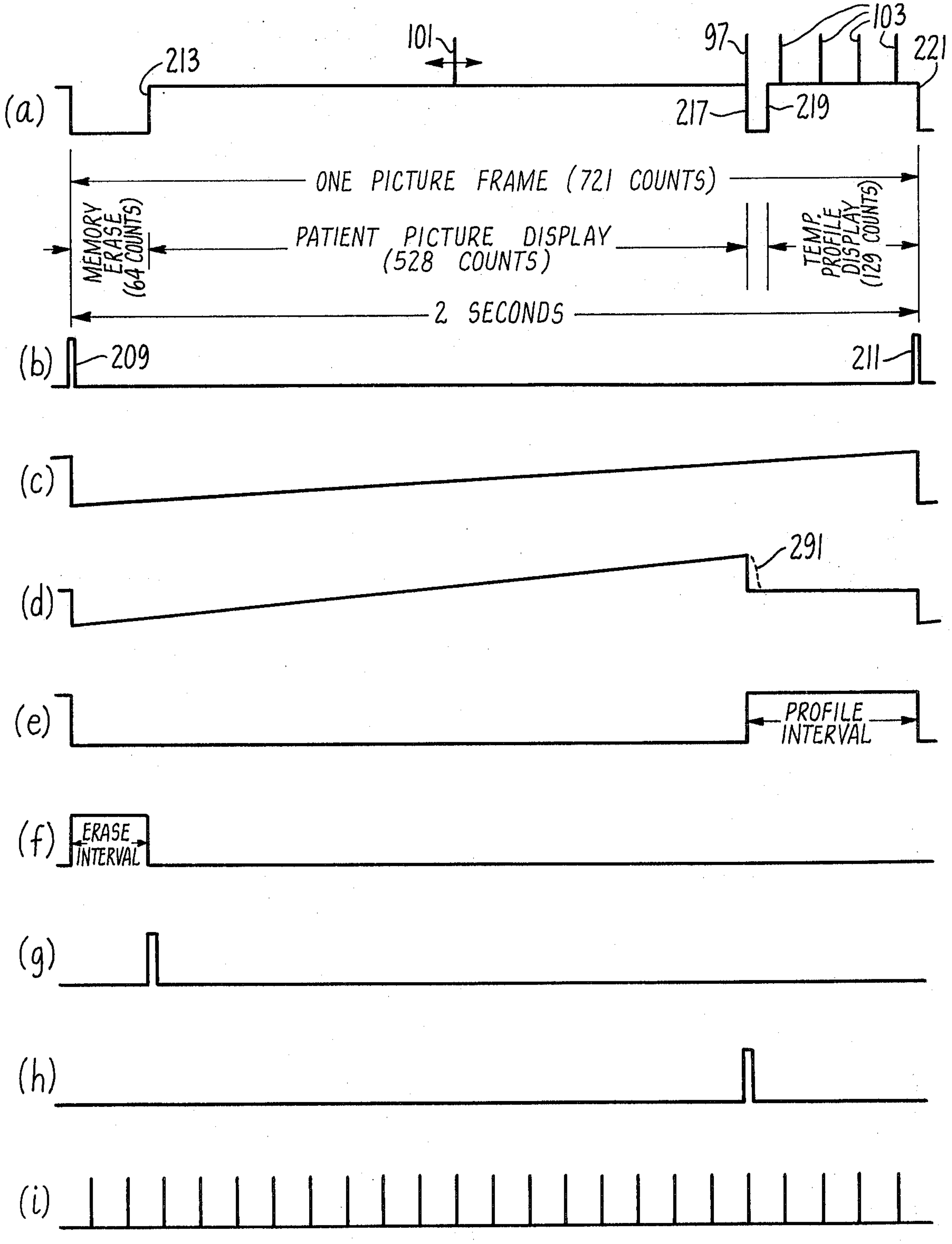
FIG. 8 illustrates the frame timing of the thermograph system of FIG. 1.

Before proceeding with the remaining video processing functions, reference should be made to FIGS. 7 and 8 which indicate generally the sequence of events during a full frame wherein an image of an object is scanned horizontal line by horizontal line across the point detector. A digital counter 205 of FIG. 7 is the primary vertical synchronizing element of the synchronizing logic circuit block 49 of FIG. 1. The counter is incremented one count for each pulse from the preamplifier 47. That is, the counter 205 is incremented once for each horizontal line as the object image is scanned over a detector. In a very specific example quantitatively described herein, the counter 205 has a maximum of 721 counts. When the counter is incremented to 721, it automatically resets to zero and a vertical synchronizing pulse is generated at that time at a terminal 207 by appropriate logic circuitry.

Referring to FIG. 8*b*, the vertical synchronizing pulses at the output terminal 207 of the counter are shown at 209 and 211, spaced about 2 seconds apart, the time that it takes for one full frame cycle. Referring to FIG. 8*a*, it can be seen that the first horizontal line of the object image is taken after the counter 205 has advanced from its reset zero state to a count of 64 at a point 213. The 64 counts between the vertical synchronizing pulse 209 and the beginning of scanning the object image at point 213 is the time necessary to erase the memory 104 of FIG. 1. An erase pulse of 64 counts in duration is shown in FIG. 8*f* which is delivered in a line 215 from the counter 205. This erase pulse of FIG. 8*f* is applied to the memory controller 121 of FIG. 1 to enable the controller to cause the memory 104 to be erased when so commanded either under manual operation by the operator or by the counter thereof reaching its preset count.

A picture of an object is displayed for 528 counts of the counter 205, between points 213 and 217 of FIG. 8*a*. 528 counts of the counter 205 results in scanning 528 horizontal lines across the image. These 528 lines are then displayed on the face of the cathode ray tube in only a portion thereof, as shown by FIG. 3.

After a short space (dead time) of 15 counts after the end of displaying a picture on the cathode ray tube, the temperature profile curve is drawn during the final 129 counts from a point 219 to a point 221 of FIG. 8*a*. At the point 221, the counter 205 has reached its count of 721 and thus resets to zero, thereby initiating the display of a new frame of video information simultaneously with an object image being scanned relative to a point detector.

The counter 205 also contains logic circuitry for developing at a terminal 223 a profile interval signal as shown in FIG. 8*e* wherein the voltage is held at a high level from the count of the counter which corresponds to the bottom line of the picture information to the bottom line of the video display when the counter 205 is reset. This signal is used in a manner to be described hereinafter.

Additionally, the counter 205 of FIG. 7 generates a pulse every 32 counts of the counter at a terminal output thereof 225. The timing of these pulses is shown in FIG. 8*i*. These pulses are used to generate the graticule lines as shown on the bottom portion of the video display of FIG. 3.

A composite blanking signal is developed at a terminal 227 of FIG. 7 at the output of an OR gate 229. The inputs to the OR gate 229 are the erase interval signal of the line 215 from the counter 205 and the line blanking signal from the output of the one-shot 157. Composite blanking signal at the terminal 227 supplies some of the blanking in the line 93 of FIG. 1 so that the electron beam of the video monitor is not visible during times when the desired object field is not being scanned by the optical system during each horizontal line and also so that there is no display during the erase interval at the beginning of each frame.

Figure 5:
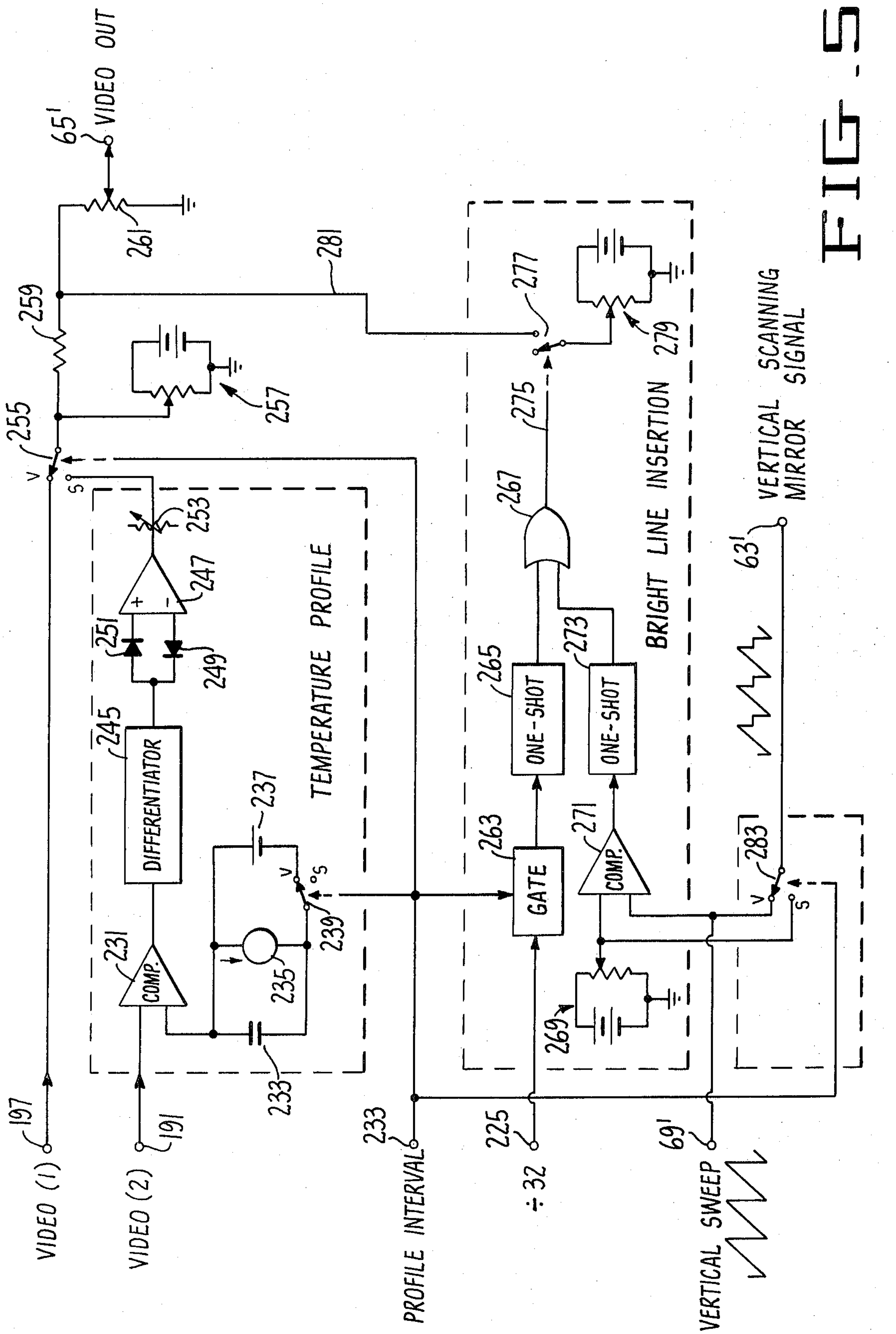
FIG. 5 shows in block diagram form another portion of the video processing block of FIG. 1.

Referring to FIG. 5, the remaining video processing circuits of the block 61 of FIG. 1 are described. The video input terminals 191 and 197 of FIG. 5 receive signals from their counterpart terminals at the output of the automatic brightness control circuits of FIG. 4. The composite video output signal at a terminal 65' of FIG. 5 is that signal in the output line 65 of the video processing block 61 of FIG. 1. It is in the circuits illustrated in FIG. 5 that the graticule lines are inserted into the video signal, the fiducial line is inserted into the video signal, the temperature profile is calculated and made part of the video output signal and the vertical mirror scanning signal in the line 63 of FIG. 1 is developed.

A comparator amplifier 231 compares the video signal at the terminal 121 with the voltage across a capacitor 233. A constant current source 235 is connected across the capacitor in a manner to decrease the voltage across the capacitor 233 at a uniform rate by drawing off a uniform current during its discharge mode of operation. A direct current voltage source 237 of a fixed value is also connected in parallel across the capacitor 233 when a switch 239 is in its position as shown in FIG. 5. The switch 239 is changed from its V state as shown to its S state once each frame during the porfile interval signal of FIG. 83. As the counter 205 of FIG. 7 reaches the count corresponding to the bottom edge of the picture displayed onthe video monitor, the switch 239 is thrown to its S state as the voltage of FIG. 8*e* rises. It remains in the S state until the voltage of FIG. 83 drops back to its lower level coincident with the resetting of the counter 205 of FIG. 7.

Therefore, during the profile interval, the capacitor 203 is discharging due to the constant current source 235 at a constant rate. The output level of the comparator 231 is thus high during all periods that the video signal at the point 191 remains greater than the voltage across the capacitor 233. This may be observed more particularly by reference to FIG. 6*a*. A gradually declining dotted line 241 represents a declining voltage across the capacitor 233 of FIG. 5. The capacitor 233 charge is a maximum at the beginning of the profile interval. A single horizontal line of the image is repetitively scanned during the profile interval and is represented by a voltage function 243 of FIG. 6*a*. The voltage variation 243 is proportional to the temperature across the object image coincident with the fiducial mark 101 of FIG. 3 and is used in the circuits of FIG. 5 to form the profile display 99 of FIG. 3.

Referring again to FIG. 6*a*, it will be noted that the function 243 of the single horizontal line across the image will be repeated once for each count on the synchronizing counter 205 of FIG. 7 during the profile interval, a total of about 146 times. At the end of this time, the voltage curve 241 of FIG. 6*a* that represents the declining voltage across the capacitor 233 of FIG. 5 has reached zero. When the profile interval signal of FIG. 8*e* as applied to the terminal 223 of FIG. 5 decreases back to its low level, the switch 239 will return from its S position that it maintains during the profile interval back to the video position as shown. In the video position, the capacitor 233 is recharged to the voltage of the direct current source 237 while picture information is displayed during the next frame.

Figure 6:
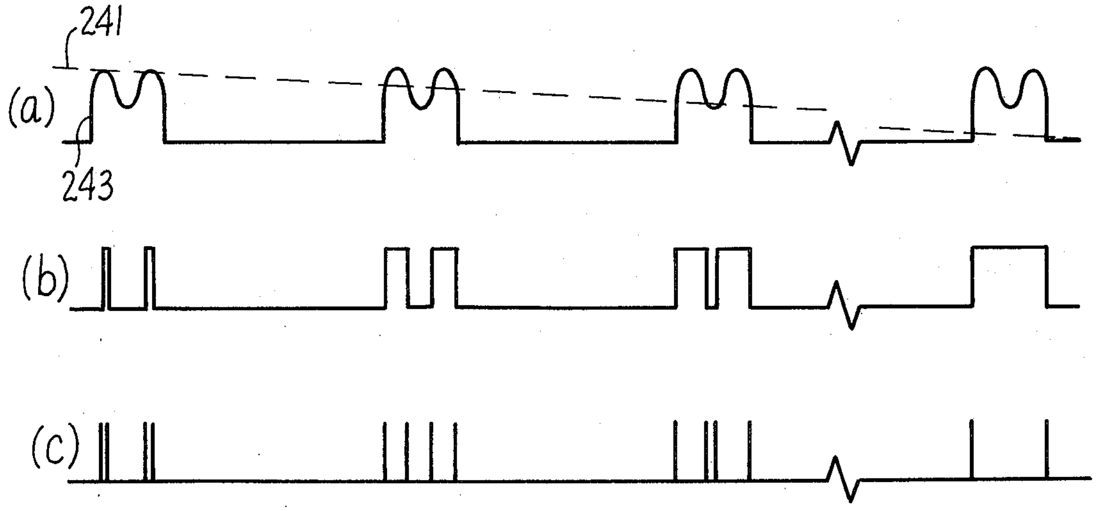
FIG. 6 illustrates the operation of a portion of the circuit of FIG. 5.

The output of the comparator 231 of FIG. 5 is shown in FIG. 6*b*. This signal could be displayed during the profile interval but would result in a display wherein the entire area below the line 99 of FIG. 3 would be bright. In order to present a sharp bright line 99, a differentiator 245, which most simply may be a single series capacitor, is connected to the output of the comparator 231. The output of the differentiator 245 is a series of positive and negative spikes corresponding to the leading and falling edges, respectively, of the output of the comparator 231. In order to transform all of these spikes to the same polarity, an operational amplifier 247 is employed having a pair of opposing diodes 249 and 251 connected respectively to its inverting and non-inverting inputs. The output signal of the operational amplifier 247 is shown in FIG. 6*c*. The signal of FIG. 6*c* is level adjusted by an adjustable potentiometer 253 of FIG. 5 and then is applied to a terminal S of a switch 255.

The switch 255 operates to connect the output terminal 65' to the temperature profile circuits (terminal S of the switch 255) during the profile interval commanded by the signal of FIG. 8*e* when applied to the terminal 223 of FIG. 5. When a switch 255 is in its V position as shown, the video output terminal 65 provides information for scanning out a picture 95 of an object. Disposed between the switch 255 and the video output terminal 65' is a variable D.C. brightness control circuit 257, a series resistance 259 and a contrast adjusting potentiometer 261. The switches 239 and 255 are not, of course, mechanical switches but rather are suitable dual input gated switches. The switch 255 is preferably a dual input gating amplifier.

The 32 line interval pulses of FIG. 8i at the terminal 225 of FIG. 5 are received by a gate circuit 263 which allows the pulses to pass during the profile interval when a pulse is simultaneously received by the gate 263 from the profile interval terminal 223. The selected 32 line interval pulses at the output of the gate 263 trigger a one-shot multivibrator 265 and its output forms one input to an OR gate 267. The output of the one-shot 265 forms the graticule lines 103 of the display of FIG. 3.

In order to produce the fiducial mark 101 of the video monitor display of FIG. 3, a variable D.C. source 269 of FIG. 5 is applied to one terminal of a comparator 271. The vertical sweep signal as developed by the slow vertical sweep oscillator of the block 61 of FIG. 1 is applied to the terminal 69' and thus to the other input of the comparator 271. When the vertical sweep rises to a voltage level that is greater than the D.C. voltage level fixed by the circuit 269, an output appears from the comparator 271 which triggers a one-shot 273 whose output forms a second input to the OR gate 267. An output line 275 of the OR gate 267 controls a switch 277. The switch 277 is normally in its off state as shown except when there is an output in the line 275 of the OR gate 267. The switch 277 then closes and connects a direct current voltage supply circuit 279 directly to the contrast potentiometer 261 through a line 281. Therefore, the fiducial mark 101 of the display of FIG. 3 and the graticule lines 97 and 103 have a brightness which depends upon the voltage set in the circuit 279. The one-shot multivibrators 265 and 273 each have an output for a duration approximately equal to the horizontal line interval of 2.8 msec.

Another dual input switch 283 of FIG. 5 is operated in response to the profile interval signal at the terminal 223. The vertical sweep output of the slow vertical sweep oscillator, at terminal 69', is connected with the V terminal of the switch 283. The direct current adjusting circuit 269 is connected with the S terminal of the switch 283. Therefore, the output voltage at the terminal 63' follows the vertical sweep oscillator output until the profile interval begins. At this time, the switch 283 is thrown into its S position and the output at the terminal 63' is held at a constant level determined by the setting in the voltage supply circuit 269 for the duration of the profile interval. The vertical sweep signal at the terminal 69' is shown in FIG. 8*c* while the output vertical scanning mirror signal at the point 63' is shown in FIG. 8*d*.

The voltage function thus developed at the terminal 63' is the vertical scanning mirror signal of the line 63 of FIG. 1. During the profile interval, the torque motor 29 which drives the rocking mirror 19 receives a constant D.C. voltage according to that set by the voltage supply circuit 269 of FIG. 5. Since a common variable direct current voltage source 269 controls both the position of the fiducial mark 101 on the display of FIG. 3 and the position at which the mirror 19 of FIG. 1 remains fixed during the profile interval, the line of the object field which is repetitively scanned by the polygon mirror 17 during the profile interval is accurately reflected by the position of the fiducial mark 101 in the video monitor display.

The angular position of the mirror 19 desirably follows closely the voltage function of FIG. 8*d*. Of course, there is some response time due to inertia of the mirror 19 assembly. A dotted line 291 on FIG. 8*d* shows the change in position of the mirror 19 to lag the change in voltage applied to its torque motor 29 at the beginning of the profile interval. This lag is the reason for the blanking between the points 217 and 219 (FIG. 8*a*) of each frame.

The various aspects of the present invention have been described in detail with respect to a specific example, but it will be understood that the invention is entitled to the full scope of the appended claims.

We claim:

1. Apparatus for scanning electromagnetic radiation of an object field and displaying a visible image thereof, comprising:

means for scanning a two-dimensional electromagnetic energy image of an object line-by-line in a given raster pattern to produce a time varying signal proportional to the intensity thereof, a video monitor display system including means for scanning an image line-by-line over a display face of the video monitor in a raster pattern that is proportionally the same as said given raster pattern, and a video processor receiving said time varying electrical signal for modulating the intensity of the video scanning means to trace a picture on the display face of the video monitor, said video processor including:

means for modulating the video scanning means for a certain number of scanned raster lines to produce a visual image of the two dimensional object image, and means modulating the video scanning means when scanning other of its raster lines for displaying a graph of the time varying signal occurring along one line of the object image, said graph being displayed without disturbing the line-by-line raster scan of the video scanning means.

2. Apparatus according to claim 1 wherein said video processor additionally includes means for generating a plurality of bright graticular lines on the graph portion of the display, whereby the intensity of the object image radiation across said one image line may be quantitatively determined by comparison with the reference graticule lines.

3. Apparatus according to claim 1 which additionally comprises means for displaying a bright line on the face of the video monitor which is coincident with said one line of the image that is being graphically displayed as to its electromagnetic intensity.

4. Apparatus according to claim 1 which additionally comprises, a memory for receiving and storing at least one frame of the time varying signal from the scanning and detecting means in synchronism with the image of the object field being scanned, and means responsive to the memory for repetitively displaying on the video monitor a stored frame of the time varying signal at television rates.

5. Apparatus according to claim 1 which additionally comprises:

means for detecting and storing the maximum level of the time varying electrical signal output of said scanning means during the time that the scanning means scans one frame of the object field electromagnetic radiation, whereby said maximum level of the electrical signal is proportional to the maximum brightness of the object field image, means for transferring the stored maximum electrical signal level from said detecting and storing means to a second storage means after the end of each scanned frame, and means for combining the maximum signal level stored in said second storage means with said time varying electrical signal generated by the scanning means before it is applied to the video monitor, whereby an automatic brightness control is provided.

6. Apparatus according to claim 1 wherein said scanning means included a detector characterized by a changing electrical characteristic proportional to the intensity of electromagnetic radiation within the infrared wavelength range falling thereon, whereby said apparatus becomes a thermograph.

7. Apparatus according to claim 6 wherein said detector is a single element infrared detector, and wherein the scanning means additionally comprises:

an electronic preamplifier responsive to the changing electrical characteristic of said detector for generating a time varying electronic video signal, means for imaging an object field onto said detector, a reference temperature object disposed adjacent the object field, a rotating mirror assembly for scanning the object image horizontally relative to said detector, said mirror assembly reflecting the reference temperature object onto said detector prior to each horizontal scan of the object image, a rocking mirror assembly for scanning the object image vertically with respect to the detector, said rotating mirror assembly scanning the object image a large number of horizontal times for each time that the rocking mirror assembly scans the object image once vertically with respect to the detector, whereby the time varying electronic signal at the output of the pre-amplifier is representative of the object field infrared intensity line-by-line horizontally across the object, a capacitor coupling the output of said pre-amplifier and subsequent video processing circuits, and means responsive to the rotating mirror position for connecting the side of said capacitor removed from the output of the pre-amplifier to a fixed potential for a time period in each horizontal scan of the object image coincident with the detector being exposed to the reference temperature object, whereby the time varying electronic video signal supplied to said video processor is referenced to a fixed potential for each horizontal scan line.

8. Apparatus for scanning electromagnetic radiation of an object field and displaying a visible image thereof, comprising:

means for scanning a two-dimensional electromagnetic energy image of an object line-by-line in a given raster pattern to produce a time varying signal proportional to the intensity thereof, a video monitor display system including means for scanning an image line-by-line over a display face of the video monitor in a raster pattern that is proportionally the same as said given raster pattern, and a video processor receiving said time varying electrical signal for modulating the intensity of the video scanning means to trace a picture on the display face of the video monitor, said video processor including:

means for modulating the video scanning means for a certain number of scanned raster lines to produce a visual image of the two-dimensional object image, and means modulating the video scanning means when scanning other of its raster lines for displaying a graph of said time varying signal occurring along one line of the object image, said graph being displayed without disturbing the line-by-line raster scan of the video scanning means, said means for modulating the video scanning means to display a graph including:

means for repetitively comparing a time varying signal for said one line across the image with a reference voltage that is proportional in magnitude to the raster line being scanned by the video scanning means as the graph is being displayed thereby, means for detecting when the time varying signal for one line of the image is greater than said reference voltage, and means for modulating the intensity of said scanning means while it is displaying said graph according to the detection of the signal voltage of said one line being greater than said reference voltage.

9. Apparatus for scanning electromagnetic radiation of an object field and displaying a visible image thereof, comprising:

means for scanning a two-dimensional electromagnetic energy image of an object line-by-line in a given raster pattern to produce a time varying signal proportional to the intensity thereof, a video monitor display system including means for scanning an image line-by-line over a display face of the video monitor in a raster pattern that is proportionally the same as said given raster pattern, said video monitor display system including a single cathode ray tube as the video monitor and having an electron beam as its video scanning means, means for scanning the cathode ray tube electron beam at a slow rate of one frame in about two seconds or longer in synchronism with the scanning of said image of the object field, and means for scanning the cathode ray tube electron beam at a fast rate of about 60 frames per second, and a video processor receiving said time varying electrical signal for modulating the intensity of the video scanning means to trace a picture on the display face of the video monitor, said video processor including:

means for modulating the video scanning means for a certain number of scanned raster lines to produce a visual image of the two-dimensional object image, and means modulating the video scanning means when scanning other of its raster lines for displaying a graph of said time varying signal occurring along one line of the object image, said graph being displayed without disturbing the line-by-line raster scan of the video scanning means.

10. A thermograph system, comprising:

a single element detector with a changing electrical characteristic proportional to the intensity of electromagnetic radiation within the infrared range falling thereon, a polygon mirror assembly having a plurality of mirror surfaces parallel with an axis of rotation wherein each mirror surface scans an object image horizontally with respect to the detector, said polygon mirror assembly including a motor means for driving said mirror about its axis of rotation at substantially a constant angular velocity, a rocking mirror assembly positioned for scanning said object image vertically with respect to the detector, said mirror assembly including a driving motor that angularly positions said mirror in proportion to the level of direct current voltage applied thereto, means for sensing the position of said polygon mirror and emitting a horizontal synchronizing pulse each time one of its mirror surfaces is in a predetermined angular position with respect to the object field and the detector, a free running digital counter for controlling the vertical object image scanning mirror, logic circuitry connected to said digital counter for emitting a vertical synchronizing pulse when said digital counter reaches a certain predetermined count, a video display system including horizontal and vertical sweep oscillators that are triggered by said horizontal and vertical synchronizing pulses, respectively, for scanning an electron beam over an entire display surface line by line in a raster pattern, an adjustable direct current voltage source, means for supplying a voltage function to the rocking mirror driving motor that is related to the output of said vertical sweep oscillator for a certain number of counts of said digital counter, said rocking mirror motor supplying means additionally including means for switching the supply to the mirror motor from a signal proportional to the output of the vertical sweep oscillator to a constant voltage of said adjustable direct current voltage source for a period of time controlled by logic circuitry connected with said digital counter, whereby said constantly rotating polygon mirror repetitively scans a single line of the object image during the period of time that the rocking mirror motor is connected with the adjustable D.C. voltage source and further whereby the particular line of the object image to be so repetitively scanned is selected by the level of the adjustable direct current voltage source, and a video processor for applying time varying electrical changes of said detector to modulate the intensity of said electron beam, said video processor including means for displaying a graph of a temperature profile across the one line of the object image that is being repetitively scanned during the period of time controlled by said digital counter wherein the rotating mirror motor is connected with said adjustable direct current voltage source, said graph of the temperature profile being displayed on a portion of the screen not occupied by the display of an image of the object field and further without alterning the horizontal and vertical sweep oscillator outputs according to the magnitude or shape of the temperature profile.

11. A thermograph system according to claim 10 wherein said video processor additionally includes means responsive to the direct current level of said adjustable direct current source to add a bright mark across the video display system screen coincident with the line of the object image that is being repetitively scanned for displaying a temperature profile thereacross.

12. A thermograph system according to claim 10 wherein said video processor additionally includes means responsive to said digital counter for adding a plurality of graticule lines at fixed vertical positions across the video display system screen in that area thereof wherein the profile temperature curve is displayed.

13. A thermograph according to claim 10 wherein said means for displaying a temperature profile curve of the object image across said one line comprises:

a capacitor connected across a constant current drain circuit in order to produce a voltage discharge curve that is substantially a straight line, a fixed direct current voltage source, means responsive to said digital counter for connecting said capacitor to said direct current voltage source during the period of time of each frame wherein the object image is being scanned in two dimensions over the detector and for disconnecting the battery from the capacitor during the period of time of each frame that a single line of the object image is being repetitively scanned for displaying a temperature profile thereof, and means for repetitively comparing the signal of said one line of the object image with the voltage across said capacitor during the period of time that the one line is being repetitively scanned, said comparison means producing an output for the period that the signal of the one line is greater than the gradually decreasing voltage across said capacitor, said comparator output being used to modulate the video display system electronic beam for displaying a temperature profile curve.

14. A thermograph system according to claim 13 wherein the video processor additionally includes a differentiating circuit connected to the output of said comparator so that the video display system electron beam is modulated to form a single line temperature profile curve on the face of the video monitor.

15. Apparatus for generating a video frame signal, comprising:

means for scanning in two-dimensions an electromagnetic energy field line-by-line in a raster scan and for detecting a time varying signal proportional to the intensity thereof, means for applying said time varying signal as said video frame signal for one portion thereof, whereby the video frame signal permits reconstruction of an image of said electromagnetic energy field during said portion by a raster scan display device, and means receiving the time varying signal during one scan line thereof for developing said video frame signal for a second portion thereof that permits displaying a graph of the electromagnetic field intensity across said one scan line thereof with a raster scan, whereby a two-dimensional image of said object field and said graph may be simultaneously displayed by a raster scan video monitor.

* * * * *